United States Patent [19]

Arai et al.

[11] Patent Number: 5,264,484
[45] Date of Patent: Nov. 23, 1993

[54] ROOM TEMPERATURE CURABLE ORGANOPOLYSILOXANE COMPOSITION HAVING MILDEWPROOFING PROPERTY

[75] Inventors: Masatoshi Arai; Kazutoshi Fujioka, both of Annaka; Yasushi Moriyama; Akihiro Kawaguchi, both of Kitakyushu; Hiroshi Hasuike, Sakura; Kazuo Takahashi, Fujisawa, all of Japan

[73] Assignee: Shin-Etsu Chemical Co., Ltd., Tokyo, Japan

[21] Appl. No.: 866,427

[22] Filed: Apr. 10, 1992

[30] Foreign Application Priority Data

Apr. 10, 1991 [JP] Japan .................. 3-104703
Dec. 20, 1991 [JP] Japan .................. 3-355150

[51] Int. Cl.$^5$ .................. C08J 3/07; C08G 77/06
[52] U.S. Cl. .................. 524/714; 524/731; 528/34
[58] Field of Search .......... 524/731, 714; 528/34; 514/640

[56] References Cited

U.S. PATENT DOCUMENTS

| | | | |
|---|---|---|---|
| 2,963,399 | 12/1960 | Bluestone | 514/640 |
| 3,260,644 | 7/1966 | von Schmeling | 514/640 |
| 3,652,770 | 3/1972 | Rohr et al. | 514/640 |
| 4,247,442 | 1/1981 | Shimizu | 260/332 SB |
| 4,371,682 | 2/1983 | Hashimoto | 528/34 |
| 4,956,435 | 9/1990 | Chu et al. | 528/17 |

FOREIGN PATENT DOCUMENTS 0389235 9/1990 European Pat. Off.

OTHER PUBLICATIONS

World Patents Index Latest, AN 89-275166, & JP-A-1-201377, Aug. 14, 1989, "Resin Composition Manufacture-Antifouling-Coating Composition Contain Low Temperature Cure-Silicone-Rubber-Silicone-Contain Low Temperature Cure-Silicone-Rubber-Silicone-Contain Polyacrylic Polymer".

World Patents Index, AN 74-52876V, & JP-B-4-9-024216, "Acetaldehyde Aqueous Contain Ethanol-Fungicide-Heat Hydroxylamine Industrial Phenoxy Solution Substitute".

Primary Examiner—John C. Bleutge
Assistant Examiner—M. W. Glass
Attorney, Agent, or Firm—Oblon, Spivak, McClelland, Maier & Neustadt

[57] ABSTRACT

A condensation curable organopolysiloxane composition, capable of curing in the presence of moisture in air to become a rubber-like elastic material, comprising a compound having at least one carbon-bonded hydroxyimino group in its molecule. The composition is capable of inhibiting effectively, and for a long time, the propagation of any of a variety of fungi on the surface of a cured product of the composition.

7 Claims, No Drawings

ROOM TEMPERATURE CURABLE ORGANOPOLYSILOXANE COMPOSITION HAVING MILDEWPROOFING PROPERTY

BACKGROUND OF THE INVENTION

1. Field of the Invention

The present invention relates to a room temperature curable organopolysiloxane composition which cures easily in the presence of moisture in air to become a rubber-like elastic material, and more particularly to a room temperature curable organopolysiloxane composition having excellent mildewproofing properties.

2. Description of the Prior Art

Heretofore, room temperature curable organopolysiloxane compositions which cure easily in the presence of moisture to form a rubber-like elastic material have been used for a wide range of applications such as adhesive, coating material, electrically insulating sealing material, constructional sealing material, etc. This type of compositions, however, have the disadvantage that in a long-term use thereof, the appearance of their cured products is damaged due to propagation of fungi deposited on the surface thereof.

In order to prevent the deposition and propagation of fungi, a number of methods have been known for controlling the propagation of fungi by adding a mildewproofing agent to the compositions of the above type. For example, there have been known a method by addition of 2,3,5,6-tetrachloro-4-methylsulfonylpyridine (Japanese Pre-examination Patent Publication (KOKAI) No. 51-106158 (1976)), a method by addition of 2-(4-thiazolyl)benzimidazole (Japanese Pre-examination Patent Publication (KOKAI) No. 54-127960 (1979)), a method by addition of an N-substituted benzimidazolyl carbamate derivative (Japanese Pre-examination Patent Publication (KOKAI) No. 56-38348 (1981)), a method by addition of a germicide having the following general formula:

$$R-Ph-SO_2-C(R')_2-I$$

wherein R is a hydrogen atom, a halogen atom or an alkyl group of from 1 to 4 carbon atoms, and R' is a hydrogen atom, an iodine atom or an alkyl group of from 1 to 4 carbon atoms (Japanese Pre-examination Patent Publication (KOKAI) No. 56-127658 (1981)), a method by addition of triorganotin compound (Japanese Pre-examination Patent Publication (KOKAI) Nos. 56-133150 (1981) and 57-96044 (1982)), a method by addition of benzimidazolyl alkyl carbamate (Japanese Pre-examination Patent Publication (KOKAI) No. 60-18693 (1985)), a method by addition of tetraalkylthiuram disulfide (Japanese Pre-examination Patent Publication (KOKAI) No. 60-115660 (1985)), and so on.

However, the conventional methods are limited in the kind of fungi whose propagation can be prevented. In addition, according to the conventional methods it has been difficult to maintain the mildewproofing effect for a long time.

SUMMARY OF THE INVENTION

It is accordingly an object of the present invention to provide a room temperature curable organopolysiloxane composition effective in inhibiting for a long time the propagation of extensive fungi, and a cured product of the same.

According to the present invention, there is provided a room temperature curable organopolysiloxane composition comprising:

(a) a diorganopolysiloxane having the following general formula (1):

wherein $R^1$ may be the same or different and each are a substituted or unsubstituted monovalent hydrocarbon group of from 1 to 10 carbon atoms, and n is a positive integer, (b) an organosilicon compound having at least two hydrolyzable groups in its molecule, and (c) a compound having at least one carbon-bonded hydroxyimino group in its molecule.

Namely, it is a dominant characteristic of the composition of the present invention to incorporate the hydroxyimino group-containing compound of the component (c) as an agent for inhibiting propagation of fungi, whereby deposition or propagation of fungi on the surface of a cured product of the composition can be inhibited effectively and for a long time, the inhibitive effect being on various kinds of fungi.

DETAILED DESCRIPTION OF THE INVENTION

(a) Diorganopolysiloxane

In the composition according to the present invention, a diorganopolysiloxane having the above general formula (1):

wherein $R^1$ and n are as defined above, is used as a base polymer.

In the above general formula (1), the monovalent hydrocarbon groups $R^1$ each have from 1 to 10, preferably from 1 to 8, carbon atoms. Typical examples of $R^1$ include alkyl groups such as methyl, ethyl, propyl, butyl, hexyl, etc.; aryl groups such as phenyl, tolyl, etc.; alkenyl groups such as vinyl, allyl, butenyl, hexenyl, etc.; cycloalkyl groups such as cyclohexyl, etc.; aralkyl groups such as benzyl, 2-phenylethyl, etc.; and groups derived from these groups by substituting a part or all of the carbon-bonded hydrogen atoms with a halogen atom, cyano group or the like, the derived groups including, for example, chloromethyl, trifluoropropyl, cyanoethyl, and so on.

In the general formula (1) above, n is a number corresponding to the polymerization degree. From the viewpoint of viscosity, workability and the like, n is preferably an integer in the range from 50 to 2,000.

Such diorganopolysiloxanes of the component (a) include, for example, those diorganopolysiloxanes which have any of the following chemical formulas:

$$H-O-(SiMe_2O)_p-H,$$

$$H-O-(SiMe_2O)_p-(SiPh_2O)_q-H,$$

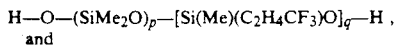
and

wherein in the formulas Me is a methyl group, Ph is a phenyl group, and p and q are each a positive integer, with p+q being an integer corresponding to n.

(b) organosilicon compound having hydrolyzable group

The organosilicon compound of the component (b) must have at least two hydrolyzable groups, and incorporation of such component ensures room-temperature cure of the composition of the present invention in the presence of moisture or water content.

The hydrolyzable groups include, for example, alkoxyl groups such as methoxyl, ethoxyl, propoxyl, butoxyl, methoxyethoxyl, ethoxyethoxyl, etc.; alkenyloxyl groups such as propenoxyl, isopropenoxyl, isobutenyloxyl, 1-ethyl-2-methylvinyloxyl, etc.; ketoxime groups such as dimethyl ketoxime, methyl ethyl ketoxime, diethyl ketoxime, cyclopentanoxime, and cyclohexanoxime groups; acyloxyl groups such as acetoxyl, propionyloxyl, butyroyloxyl, benzoyloxyl, etc.; amino groups such as N-methylamino, N-ethylamino, N-propylamino, N-butylamino, N,N-diethylamino, and cyclohexylamino groups; amide groups such as N-acetylacetamide, N-ethylacetamide, and N-methylbenzamide groups; aminoxyl groups such as N,N-dimethylaminoxyl, N,N-diethylaminoxyl, etc.; isocyanate group; α-silyl ester groups; halogen atoms such as chlorine; and so on. Where the organosilicon compound of the component (b) has a chlorine or other halogen atom as a hydrolyzable group, much care should be given to the danger from evolution of the strongly corrosive and toxic halogen halide gas upon hydrolysis reaction of the compound.

In the organosilicon compound of the component (b), other groups than the silicon-bonded hydrolyzable group are preferably substituted or unsubstituted monovalent hydrocarbon groups similar to $R^1$ in the component (a). Such monovalent hydrocarbon groups are preferably alkyl groups of from 1 to 8 carbon atoms, alkenyl groups of from 2 to 10 carbon atoms, phenyl group and the like, from the viewpoint of ease of synthesis.

Typical examples of the organosilicon compound of the formula (b) having hydrolyzable groups include alkoxysilanes such as methyltrimethoxysilane, vinyltrimethoxysilane, phenyltrimethoxysilane, methyltriethoxysilane, tetramethoxysilane, tetraethoxysilane, tetrapropoxysilane, 3-chloropropyltrimethoxysilane, etc.; alkenyloxysilanes such as methyltriisopropenyloxysilane, vinyltriisopropenyloxysilane, phenyltriisopropenyloxysilane, etc.; ketoximesilanes having an oxime group of the formula: $-O-N=CR_2$ where each R is a monovalent hydrocarbon group provided that the two R groups may form together a divalent hydrocarbon group to form a ring, such as methyltris(methyl ethyl ketoxime)silane, vinyltris(methyl ethyl ketoxime)-silane, phenyltris(methyl ethyl ketoxime)silane, methyltris(dimethyl ketoxime)silane, tetrakis(methyl ethyl ketoxime)silane, etc.; acetoxysilanes such as methyltriacetoxysilane, vinyltriacetoxysilane, phenyltriacetoxysilane, tetraacetoxysilane, etc.; aminosilanes such as methyltris(N-butylamino)silane, vinyltris(N-hexylamino)silane, phenyltris(N,N-diethylamino)silane, etc.; amidosilanes such as methyltris(N-methylacetamido)silane, vinyltris(N-ethylacetamido)silane, etc.; aminoxysilanes such as methyltris(N,N-diethylaminoxy)silane, vinyltris(N,N-diethylaminoxy)silane, etc.; and partially hydrolyzed products of these organosilicon compounds. These may be used singly or in combination of two or more.

The component (b) is used preferably in an amount of from 0.2 to 30 parts by weight, more preferably from 0.5 to 20 parts by weight, per 100 parts by weight of the diorganopolysiloxane of the component (a). If the amount of the component (b) is excessively small, the resulting composition cannot cure satisfactorily. It the amount is excessively large, on the other hand, the cured product obtained will be hard and brittle, such properties being deleterious to performance as a sealing material.

(c) Compound having hydroxyimino group

The compound of the component (c) is a compound having at least one carbon-bonded hydroxyimino group $(HO-N=C)$ in its molecule. Such compounds are represented by oxime compounds. The hydroxyimino group-containing compounds have strong antifungal properties against most fungi. By incorporating such a compound in a composition, according to the present invention, it is possible to inhibit effectively and for a very long time the propagation of any of a variety of fungi.

In the present invention, suitable examples of the hydroxyimino group-containing compound include the oxime compounds having respectively the following general formulas (2) to (6):

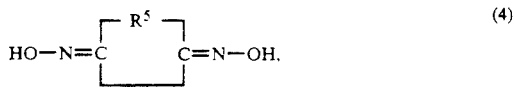

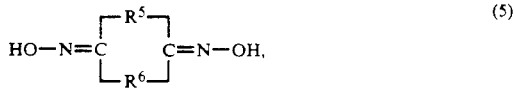

and

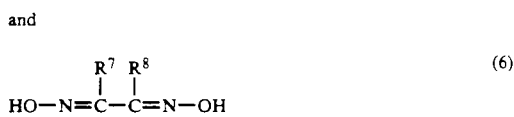

wherein in the formulas $R^2$, $R^3$, $R^7$ and $R^8$ are each a hydrogen atom or a substituted or unsubstituted monovalent hydrocarbon group of from 1 to 10 carbon atoms, provided that $R^2$ and $R^3$ may be the same or different from each other, and $R^7$ and $R^8$ may be the same or different from each other; $R^4$, $R^5$ and $R^6$ are each an unsubstituted or substituted divalent hydrocarbon groups of from 2 to 10 carbon atoms, provided that $R^5$ and $R^6$ may be the same or different from each other.

These compounds may be used either singly or in combination of two or more.

In the above general formulas, the monovalent hydrocarbon groups $R^2$, $R^3$, $R^7$ and $R^8$ include, for example, alkyl groups such as methyl, ethyl, propyl, isopropyl, butyl, t-butyl, pentyl, hexyl, etc.; aryl groups such as phenyl, tolyl, etc.; alkenyl groups such as vinyl, allyl, etc.; cycloalkyl groups such as cyclohexyl, etc.; aralkyl groups such as benzyl, $\beta$-phenylethyl, etc.; and groups derived from these groups by substituting some or all of the hydrogen atoms with a halogen atom, cyano group or the like, the derived groups including, for example, chloromethyl, trifluoropropyl, cyanoethyl and so on.

In the above general formulas, besides, the divalent hydrocarbon groups $R^4$, $R^5$ and $R^6$ include, for example, alkylene groups such as ethylene, propylene, tetramethylene, pentamethylene, hexamethylene, methylethylene, methylpropylene, etc.; and groups derived from these groups by substituting some or all of the hydrogen atoms with a halogen atom, cyano group or the like, the derived groups including, for example, tetrafluoroethylene group and so on.

Among the above-mentioned oxime compounds, the following compounds:

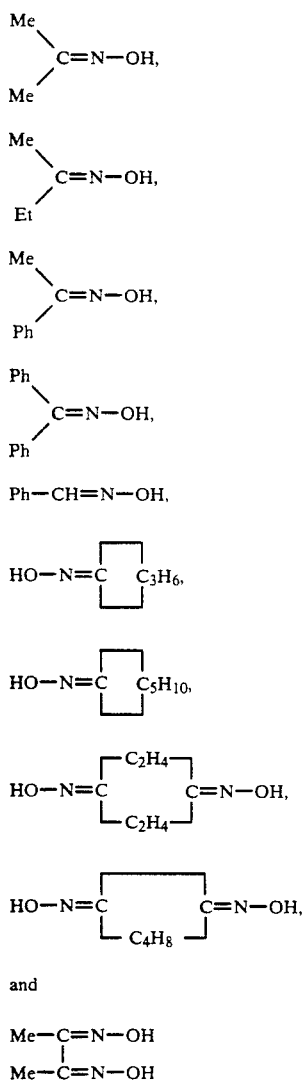

and $$\begin{array}{c} Me-C=N-OH \\ | \\ Me-C=N-OH \end{array}$$

wherein in the formulas Me is a methyl group, Et is an ethyl group, and Ph is a phenyl group, are particularly preferred for use in the present invention.

The amount of the component (c) is preferably from 0.1 to 20 parts by weight, more preferably from 0.25 to 5 parts by weight, per 100 parts by weight of the component (a). If the amount of the component (c) is excessively small, the resulting composition is insufficient in antifungal properties, whereas excessively large amounts lead to unsatisfactory cure of the resulting composition, thereby degrading the performance as a sealing material.

CONDENSATION CATALYST

Generally, a comparatively long time is needed to cure a condensation curable type organopolysiloxane composition such as the composition according to the present invention. Where the curing time is to be shortened, a condensation catalyst is normally used. The condensation catalyst for use in the present invention may be any one of those conventionally used. The usable condensation catalysts include, for example, organic tin compounds such as dibutyltin methoxide, dibutyltin diacetate, dibutyltin dioctoate, dibutyltin dilaurate, dimethyltin dimethoxide, dimethyltin diacetate, etc.; organic titanium compounds such as tetrapropyl titanate, tetrabutyl titanate, tetra-2-ethylhexyl titanate, dimethoxytitanium diacetylacetonate, etc.; amine compounds such as hexylamine, 3-aminopropyltrimethoxysilane, tetramethylguanidylpropyltrimethoxysilane, etc.; and salts thereof. These catalysts may be used either singly or in combination of two or more.

The condensation catalyst is generally used preferably in an amount of up to 10 parts by weight, more preferably from 0 to 5 parts by weight, per 100 parts by weight of the above component (a). Use of an excessively large amount of the condensation catalyst leads to unsatisfactory cure of the resulting composition, thereby impairing the performance as a sealing material.

OTHER COMPOUNDING INGREDIENTS

If necessary, the composition of the present invention may further comprise various compounding ingredients, for example, filler, pigments, dyes, adhesive agent, thixotropy improver, rust preventive, other mildewproofing agents than the component (c), flame retardant, etc.

EXAMPLES

The present invention will now be further illustrated by the following examples, in which "parts" means "parts by weight".

Example 1

A universal mixer was charged with 100 parts of $\alpha,\omega$-dihydroxydimethylpolysiloxane having a viscosity of 20,000 cSt, 2.0 parts of cyclohexanone oxime, 2.0 parts of anatase-type titanium oxide, and 10 parts of fumed silica whose surfaces had been treated with dimethyldichlorosilane. The contents of the mixer were mixed with each other to form a base compound. The base compound thus prepared was admixed with 5.0 parts of methyltriacetoxysilane at room temperature under a reduced pressure, to obtain an organopolysiloxane composition.

The composition was formed into a 2-mm thick sheet, and cured under the conditions of 20° C. and 55% RH for 7 days, to yield a cured product.

The cured product was cut into a 3-cm diameter disc, which was treated in running water for one week in order to remove the by-products arising from cure. The disc thus treated was used as a specimen for a fungus resistance test according to JIS-Z-2911, which was carried out as follows. First, a petri dish with a diameter of 9 cm was filled with potato dextrose agar, on which the specimen was placed in a central area. Next, a suspension containing spores of the fungi Aspergillus niger, Penicillium citrinum, Rhizopus nigricans, Cladosporium herbarum and Chaetomium globusum was sprayed uniformly onto the specimen, and the petri dish was closed with a cover.

After the petri dish was left to stand in a thermohygrostat adjusted to a temperature of 28° C. and a relative humidity of 98% for 56 days, the specimen was examined. No germination of fungi was observed on the specimen.

Example 2

An organopolysiloxane composition was prepared and a cured product thereof was obtained, in the same manner as in Example 1 except that 1.2 parts of dimethylglyoxime was used in place of 2.0 parts of cyclohexanone oxime which was used in Example 1. The cured product thus obtained was subjected to a fungus resistance test in the same manner as in Example 1. Again, no germination of fungi was observed.

Comparative Example 1

A composition was obtained in the same manner as in Example 1, except that cyclohexanone oxime was not compounded. When the composition thus obtained was subjected to a fungus resistance test in the same manner as in Example 1, propagation of fungi was observed over substantially the entire surfaces of the specimen.

Example 3

A universal mixer was charged with 100 parts of a,ω-dihydroxydimethylpolysiloxane having a viscosity of 20,000 cSt at 25° C., 1.5 parts of cyclohexanedione dioxime, 0.1 parts of dibutyltin dimethoxide, and 100 parts of calcium carbonate whose surfaces had been treated with a fatty soap having an average particle diameter of 0.04 μm. The contents of the mixer were mixed with each other to prepare a base compound. The base compound thus obtained was admixed with 6.0 parts of vinyltrimethoxysilane at room temperature under a reduced pressure, to obtain a desired composition.

The composition thus obtained was processed in the same manner as in Example 1 to yield a cured product. Using the cured product, a fungus resistance test was carried out in the same manner as in Example 1. No germination of fungi was observed.

Example 4

A cured product was obtained in the same manner as in Example 3, except that 2.0 parts of benzophenone oxime was used in place of cyclohexanedione dioxime and that 9.0 parts of 2-butanoximesilane was used in place of vinyltrimethoxysilane. The cured product thus obtained was subjected to a fungus resistance test in the same manner as in Example 1. Again, no germination of fungi was observed.

Comparative Example 2

A cured product was obtained in the same manner as in Example 3, except that cyclohexanedione dioxime was not compounded. When the cured product thus obtained was subjected to a fungus resistance test in the same manner as in Example 1, propagation of fungi was observed on about ⅔ of the entire surfaces of the specimen.

Comparative Example 3

A cured product was obtained in the same manner as in Example 4, except that benzophenone oxime was not compounded. The cured product thus obtained was subjected to a fungus resistance test in the same manner as in Example 1. Propagation of fungi was recognized on about ⅔ of the entire surfaces of the specimen.

We claim:

1. A room temperature curable organopolysiloxane composition comprising:
   (a) a diorganopolysiloxane having the following general formula (1):

wherein $R^1$ may be the same or different and each is a substituted or unsubstituted monovalent hydrocarbon group of from 1 to 10 carbon atoms, and n is a positive integer,
   (b) a substituted or unsubstituted monovalent hydrocarbon group substituted organosilicon compound having at least two hydrolyzable groups in its molecule, said hydrolyzable groups in its molecule, said hydrolyzable groups being selected from the group consisting of alkoxy, alkenyloxy, acyloxy, amino, amide, aminoxy, isocyanate, α-silyl ester groups and halogen atoms, and partially hydrolyzed products of one or more of said organosilicon compound, and
   (c) a compound having at least one carbon-bonded hydroxyimino group in its molecule selected from the group consisting of cyclohexanone oxime, dimethylglyoxime, cyclohexanedione dioxime and benzophenone oxime;
   wherein the component (b) is used in an amount of from 0.2 to 30 pats by weight per 100 parts by weight of the diorganopolysiloxane of the component (a), and the component (c) is used in an amount of from 0.1 to 20 parts by weight per 100 parts by weight of the diorganopolysiloxane of the component (a).

2. The composition according to claim 1, wherein a condensation catalyst additionally is present in an amount of up to 10 parts by weight per 100 parts by weight of the diorganopolysiloxane of the component (a).

3. The composition according to claim 1, wherein the hydroxyimino group-containing compound of the component (c) is cyclohexanone oxime.

4. The composition according to claim 1, wherein the hydroxyimino group-containing compound of the component (c) is dimethylglyoxime.

5. The composition according to claim 1, wherein the hydroxyimino group-containing compound of the component (c) is cyclohexanedione dioxime.

6. The composition according to claim 1, wherein the hydroxyimino group-containing compound of the component (c) is benzophenone oxime.

7. A cured product obtained by curing the composition as set forth in claim 1.

* * * * *